3,822,268
LYSERGIC ACID AMIDES
Erzsbet Magó, nee Karácsony, Tibor Balogh, József Borsi, Sándor Bajusz, Imre Moravcsik, Sándor Elek, István Polgári, and László Lowinger, Budapest, Hungary, assignors to Kobanyai Gyogyszerarugyar
No Drawing. Continuation-in-part of abandoned application Ser. No. 721,860, Apr. 16, 1968. This application July 12, 1971, Ser. No. 161,975
Claims priority, application Hungary, Apr. 20, 1967, GO-1,012; Sept. 15, 1967, GO-1,028
Int. Cl. C07d 43/20
U.S. Cl. 260—285.5               1 Claim

ABSTRACT OF THE DISCLOSURE

Lysergic acid amides of the formula

[Chemical structure diagram]

in which X is hydroxyl, thioalkyl, phenyl, hydroxyl-substituted phenyl, indolyl or imidazolyl, Y is hydrogen or methylol, $n$ is 1–3 and R is hydrogen or methyl, e.g. d-lysergic acid - 2-amido-1-hydroxy-3-(4'-hydroxy-phenyl)-propane, have a specific antiserotonine effect and are free of other effects on the central and vegetative nervous systems.

---

This is a continuation-in-part of our copending application Ser. No. 721,860, filed Apr. 16, 1968 and now abandoned.

The invention relates to pharmacologically active new d-lysergic acid amides and their acid addition salts.

The amides of d-lysergic acid formed with aminoalcohols are of considerable importance as pharmacologically active substances.

The present invention is based on the discovery that, on reducing the acid amides of lysergic acids formed with amino-acid esters by means of the borohydrides of alkaline earth metals, these amides can be converted selectively into lysergic acid amide derivatives containing hydroxyl groups. This discovery is surprising because on employing various other reducing agents, other reducible groups in the molecule are hydrogenated as well as the ester group.

According to one aspect of the invention there are provided new d-lysergic acid amides of the general formula I

[Chemical structure diagram]

wherein X is a member selected from the group consisting of hydroxyl, thioalkyl, phenyl, hydroxyl-substituted phenyl, indolyl, and imidazolyl radicals, Y is a member selected from the group consisting of hydrogen and —CH$_2$OH radicals, $n$ is an integer from 1 to 3, and R is selected from the group consisting of hydrogen and methyl radicals.

The following compounds are preferable representatives of the compounds of formula I:

d-lysergic acid-2-amido-1-hydroxy-4-methylmercapto butane,
d-lysergic acid-2-amido-1-hydroxy-3-(4'-hydroxy-phenyl)-propane,
1-methyl-d-lysergic acid-2-amido-1-hydroxy-3-(4'-hydroxy-phenyl-propane,
d-lysergic acid-1-amido-4-hydroxy-butane,
d-lysergic acid-2-amido-1-hydroxy-3-phenyl-propane,
d-lysergic acid-2-amido-1-hydroxy-3-indolyl-propane, and
d-lysergic acid-2-amido-1-hydroxy-3-imidazolyl-propane.

The new compounds according to the invention can be prepared as follows:

The amide of lysergic acid formed with amino acid esters is prepared in a known way. Thereafter the ester group of the obtained lysergic acid peptide ester is reduced with an alkaline earth metal borohydride to a hydroxymethyl group.

The d-lysergic acid amides used as starting material can be prepared by the aid of known acylating processes, such as by acylating with lysergic acid chloride, lysergic acid mixed anhydride, lysergic acid azide or acylating in the presence of dehydrating agents. A preferable acylating method is described in the British patent specification No. 480,822, which comprises the steps of preparing lysergic acid azide from lysergic acid hydrazide with a solution of sodium nitrite in a medium acidified with hydrochloric acid, and after separation reacting the obtained azide in a solvent with a compound containing a primary amino group.

The lysergic acid peptide esters can be reduced with alkaline earth borohydrides preferably by preparing the borohydride *in situ*, that is, by reacting an alkali metal borohydride, such as sodium or potassium borohydride, with an alkaline earth metal salt, such as a halide, in the reaction mixture itself.

The reduction is preferably carried out in water, ethanol, tetrahydrofurane or diethylene glycol dimethylether as solvent. Consequently, it is convenient to carry out the reduction as follows. Adequate amounts of calcium chloride and sodium borohydride are dissolved in ethanol at a temperature of about 0° C., the solution is cooled to a temperature e.g. below −10° C., and an ethanolic solution of the lysergic acid peptide ester is added dropwise. After stirring for a few hours, reduction is complete. The course of the reaction can be followed by a thin-layer chromatographic analysis on an aluminagypsum plate dried at 120° C., developed with chloroform containing 2 percent of ethanol; the amide fluoresces in ultraviolet light. After completion of the reduction, the alkaline solution is acidified with an organic or mineral acid (e.g. hydrochloric acid, sulphuric acid, tartaric acid) to pH 4–5, then the solution is evaporated to dryness. The residue is dissolved in water, the pH value of the solution is suitably adjusted and the product is extracted into a solvent (e.g. chloroform, ethyl acetate, ethanol, isopropanol). After removing the solvent by distillation, the crystalline product is isolated by filtration. If desired, the acid-addition salt of the product can be prepared e.g. with an ethanolic solution of maleic acid, tartaric acid, ethanesulphonic acid or hydrochloric acid.

The new compounds according to the invention have primarily a specific antiserotonine effect and are free of other effects on the central and vegetative nervous systems. Their antiserotonine effect is proved by the fact that in experiments carried out in vitro with various isolated organs, such as uterus of rat, and ileum of guinea pig, they inhibit in concentrations of $10^{-6}$ to $10^{-11}$ g./ml. the contraction of unstriped muscles as produced by serotonine. In experiments carried out in vivo they specifically inhibit in 50 to 250 µg./kg. intravenous doses the vasopressor effect of serotonine on cats narcotised with Penthotal (sodium - 5 - ethyl-5-(1-methyl-butyl)-2-thiobarbiturate) and rendered hypotensive with a ganglion-blocking agent. On rats they antagonise in subcutaneous doses of 15 to 100 µg./kg. the foot oedema produced with serotonine. Their effect is specific against serotonine because they do not inhibit the effect of other vegetative pharmacons, such as acetyl choline, histamine, bradyquinine, kallikrein, vasopressine, adrenalin, nor-adrenalin, and isopropyl-nor-adrenalin, either on isolated organs or in in vivo experiments. Consequently, they do not show an anticholinergic, antihistaminic, quinine-antagonistic, α- or β-adrenerg-blocking effect.

The new compounds according to the invention do not sow any neurotoxic effect in animal tests. They do not cause changes in central nervous system stimulation and in the pathological behaviour on mice and rats in subcutaneous doses of 10 to 30 mg./kg. and in per os doses of 10 to 100 mg./kg.

In electroencephalographic experiments as carried out on rabbits, they do not induce an "arousal" reaction in intravenous doses of 0.1 and 1.0 mg./kg., in contradistinction to the LSD, and they do not have any fever-inducing effect.

On the basis of acute and chronic toxicological experiments carried out on various animals, such as rats, mice, rabbits and dogs, the compounds proved to be only slightly toxic.

Due to their favourable biologic effect, the new compounds according to the invention can be advantageously used for treating such diseases where pathological vascular changes as induced by serotonine or the overproduction of serotonine are the inducing pathological factor. Thus, they can be used as drug for preventing serious states of migraine, in various angio-neurotic oedemas and in the state of vascular crisises induced by chromaphynomes.

The compounds according to the invention and their method of preparation are further illustrated by the aid of the following Examples.

EXAMPLE 1

Preparation of methyl 2-(d-lysergamido)-4-methylmercapto-butyrate (a) Preparation of 2-(d-lysergamido)-4-methylmercapto-butanoic acid methyl ester.—1.46 g. of methyl 2-amino-4-methylmercapto-butyrate are suspended in 50 ml of ethyl acetate. After adding 1.5 ml. of triethyl amine, the solution is cooled to 0° C. and it is poured to the solution of 2.2 g. of d-lysergic acid azide in 100 ml. of ethyl acetate at a temperature of —5° C. The solution is left to stand at 0° C. for a day, then it is evaporated. The residue is triturated with 20 ml. of water, then filtered, washed several times with water and dried.

(b) Preparation of 2-(d-lysergamido) - 1 - hydroxy-4-methylmercapto-butane maleate.—1.5 g. of methyl 2-(d-lysergamido)-4-methylmercapto-butyrate prepared in step (a) are dissolved together with 1.5 g. of powdered calcium chloride, under stirring, in 400 ml. of absolute ethanol. The solution is cooled to —10° C. in a salt-ice bath, then 0.8 g. of finely powdered calcium borohydride is added, under further cooling and stirring. Reduction is complete at this temperature in 4 hours. After the completion of the reduction process, the pH of the solution is adjusted with 5 N hydrochloric acid to 5, and the mixture is evaporated to dryness in vacuo. The residue on evaporation is dissolved in 100 ml. of water, and the pH of the solution is adjusted to 8 with a 10 percent solution of sodium hydroxide, then extracted by shaking with 8 consecutive 50 ml. portions of a 4:1 mixture of chloroform and isopropanol. The combined organic phase is dried with anhydrous sodium sulphate and evaporated to dryness. The dry residue is dissolved in ethanol and maleic acid added to form the maleate of the title compound; m.p. 198–200° C.; $[\alpha]_D^{20} = +46.0°$ (c.=1, water).

EXAMPLE 2

Preparation of 2-(d-lysergamido)-1-hydroxy-(4'-hydroxyphenyl)-propane (a) Preparation of methyl 2-(d-lysergamido)-3-(4'-hydroxyphenyl)-propionate.—This compound is prepared from d-lysergic acid azide and 1.72 g. of methyl tyrosinate hydrochloride using the method of Example 1(a).

(b) Preparation of 2-(d-lysergamido)-1-hydroxy-3-(4'-hydroxy)-propane maleate.—26 g. of anhydrous calcium chloride are dissolved at 0° C. in 300 ml. of absolute ethanol, then the solution is cooled to —10° C., and a solution of 1 g. of potassium borohydride in 15 ml. of ethanol is slowly added. To the suspension, the solution of the compound obtained according to (a) in 100 ml. of ethanol is added dropwise over about 2 hours, under continuous stirring. The product is isolated in the way specified in Example 2(a); m.p. 161–163° C.; $[\alpha]_D^{20} = +27.78°$ (c.=1, water).

EXAMPLE 3

Preparation of 2-(1-methyl-d-lysergamido)-1-hydroxy-3-(4'-hydroxyphenyl)-propane (a) Preparation of methyl 2-(1-methyl-d-lysergamido)-3-(4'-hydroxyphenyl)-propionate.—This compound is prepared from 1-methyl-d-lysergic acid azide and 1.72 g. of methyl tyrosinate hydrochloride, using the method of Example 1(a).

(b) Preparation of 2-(1-methyl-d-lysergamido)-1-hydroxy-3-(4'-hydroxyphenyl)-propane.—The compound is prepared from the ester obtained under (a), using the method specified in Example 1(b) and employing 2.6 g. of anhydrous calcium chloride and 1.4 g. of sodium borohydride. The isomeric derivative is removed from the product by chromatography on an alumina column, carrying out the elution with chloroform which contains 2 percent of ethanol. Melting point of the product: 115–117° C.; $[\alpha]_D^{20} = -38.48°$ (c.=0.5, ethanol).

EXAMPLE 4

Preparation of 1-(d-lysergamido)-4-hydroxybutane (a) Preparation of methyl 1-(d-lysergamido)-butyrate.—This compound is prepared from d-lysergic acid azide and 1.14 g. of methyl 1-amino-butyrate hydrochloride, using the method specified in Example 1(a).

(b) Preparation of 1-(d-lysergamido)-4-hydroxy-butane maleate.—This compound is prepared from the ester obtained under (a), using the method specified in Example 1(b). Melting point of the product: 177–179° C.; $[\alpha]_D^{20} = +63.7°$ (c.=1, water).

EXAMPLE 5

Preparation of 2-(d-lysergamido)-1-hydroxy-3-phenyl-propane (a) Preparation of methyl 2-(d-lysergamido)-3-phenyl-propionate.—This compound is prepared from d-lysergic acid azide and 1.6 g. of methyl 2-amino-3-phenylpropionate hydrochloride, using the method described in Example 1(a).

(b) Preparation of 2 - (d-lysergamido)-1-hydroxy-3-phenylpropane maleate.—The compound is prepared by reducing the ester obtained under (a), in the way specified in Example 1(b). The product is purified by chromatography on an alumina column, using chloroform as eluting agent. Melting point of the product: 201–203° C.; $[\alpha]_D^{20} = +29.04°$ (c.=1, water).

EXAMPLE 6

Preparation of 2-(d-lysergamido)-1-hydroxy-3-indol-3'-yl-propane (a) Preparation of methyl 2-(d-lysergamido)-3-indol-3'-yl-propionate.—This compound is prepared from d-lysergic acid azide and 2.0 g. of methyl-2-amino-3-indol-3'-yl-propionate hydrochloride, using the method employed in Example 1(a).

(b) Preparation of 2-(d-lysergamido)-1-hydroxy-3-indol-3'-yl-propane maleate.—This compound is prepared by reducing the ester obtained under (a) using the method employed in Example 1(b). The crude product is purified by chromatography on an alumina column, using chloroform as eluting agent. $[\alpha]_D^{20} = +22.39°$ (c.=0.5, ethanol).

EXAMPLE 7

Preparation of 2-(d-lysergamido)-1-hydroxy-3-imidazol-4'-yl-propane (a) Preparation of ethyl 2-(d-lysergamido)-3-imidazol-4'-yl-propionate.—This compound is prepared from d-lysergic acid azide and 1.2 g. of methyl histidinate, using the method specified in Example 1(a).

(b) Preparation of 2-(d-lysergamido)-1-hydroxy-3-imidazol-4'-yl-propane tartrate.—This compound is prepared by the reduction of the ester obtained under (a), employing the method specified in Example 1(b). The crude product is purified by chromatography on an alumina column. The residue obtained by evaporating the chloroform eluate is dissolved in methanol and the tartrate prepared by adding tartaric acid. $[\alpha]_D^{20} = +65.1°$ (c.=0.5, 50 percent aqueous ethanol).

What we claim is:

1. 2 - (1 - Methyl-d-lysergamido)-1-hydroxy-3-(4'-hydroxyphenyl)-propane.

References Cited

UNITED STATES PATENTS

| 2,090,430 | 8/1937  | Stoll et al.    | 260—285.5 |
| 2,997,470 | 8/1961  | Pioch           | 260—285.5 |
| 3,218,324 | 11/1965 | Hofmann et al.  | 260—285.5 |
| 3,346,580 | 10/1967 | Hofmann et al.  | 260—285.5 |

FOREIGN PATENTS

| 1,227,006 | 3/1971 | Great Britain | 260—285.5 |

DONALD G. DAUS, Primary Examiner

U.S. Cl. X.R.

260—326.14 R; 424—261